United States Patent [19]
Peters et al.

[11] 3,850,441
[45] Nov. 26, 1974

[54] ADJUSTABLE HAND TRUCK
[76] Inventors: Jack Peters, 24008 Bessemer St., Woodland Hills, Calif. 91364; Easton D. New, 12783 Telfair St., Sylmar, Calif. 91342
[22] Filed: Oct. 20, 1972
[21] Appl. No.: 299,563

[52] U.S. Cl. ............................. 280/47.2, 280/47.27
[51] Int. Cl. ............................................. B62b 1/08
[58] Field of Search ............ 280/47.2, 47.27, 47.19, 280/41 R; 248/171, 169, 298, 287

[56]  References Cited
UNITED STATES PATENTS

| 876,023 | 1/1908 | Schurger et al | 248/171 X |
|---|---|---|---|
| 2,549,584 | 4/1951 | Eller | 248/171 X |
| 2,605,117 | 7/1952 | Hooz et al. | 280/47.27 X |
| 2,612,386 | 9/1952 | Schutzer | 280/41 R |

FOREIGN PATENTS OR APPLICATIONS

| 730,169 | 5/1933 | France | 280/47.2 |
|---|---|---|---|

*Primary Examiner*—David Schonberg
*Assistant Examiner*—John A. Pekar
*Attorney, Agent, or Firm*—Pollock, Philpitt & Vande Sande

[57]  ABSTRACT

A tiltable hand truck with an auxiliary support wheel is disclosed. The hand truck comprises a pair of wheels, a base plate, and a pair of upwardly extending frame rails. A secondary frame with an auxiliary wheel is pivotally connected to the hand truck and extends outwardly behind the truck. A support rail is mounted parallel to the frame rails and carries an adjustable gripping means which locks to the support rail when engaged. The gripping means is in turn connected to the secondary frame through a linkage arm. The secondary frame and auxiliary wheels stabilize the hand truck at a specific angle when loaded. The linkage system enables the operator to lock the secondary frame and auxiliary wheel in a variety of angles with respect to the frame rails of the hand truck.

9 Claims, 6 Drawing Figures

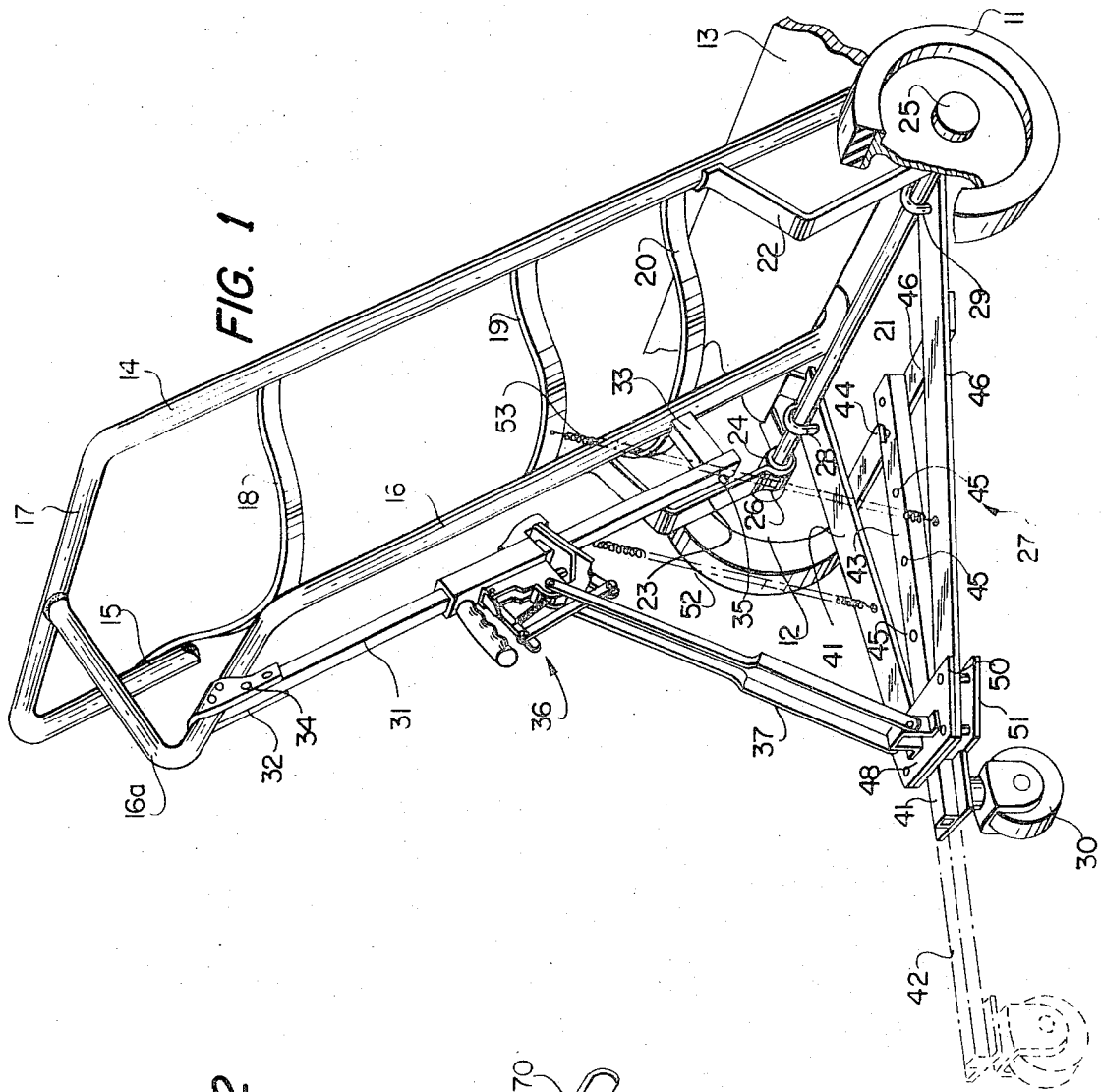
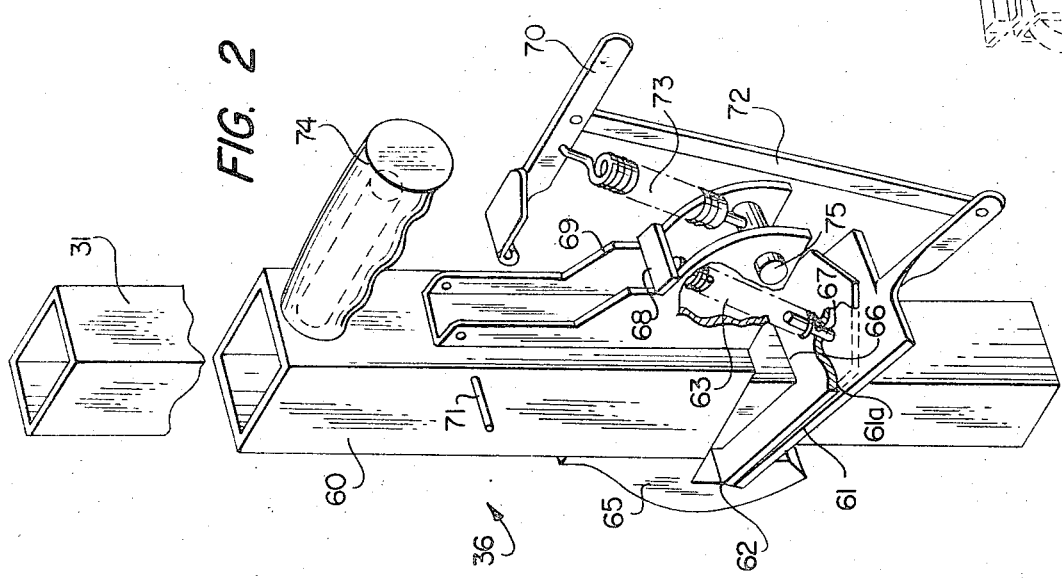

ADJUSTABLE HAND TRUCK

BACKGROUND OF THE INVENTION

The present invention relates to improvements in the design of hand trucks. The conventional design for a hand truck is well-known to anyone familiar with material handling equipment. It employs a pair of wheels, a base plate, and a pair of upwardly extending frame rails. In normal use, the operator of a hand truck tilts the load to be lifted away from the hand truck while sliding the base plate of the truck under the load. Alternately, the load may be placed on the hand truck base plate manually. Once the load is positioned on the base plate immediately adjacent the upwardly extending frame rails, the hand truck is tilted about the wheels so that the base plate and frame rails provide a support means for the load, with the center of gravity of the load positioned directly above the axle of the hand truck. The operator then moves the hand truck along the ground, balancing the center of gravity for the load above the axle of the vehicle.

Quite often, an irregularity in the road surface, an incline, or even unsteadiness on the part of the operator can shift the center of gravity to one side of the axle or to the other. Once shifted, the operator must then struggle to regain control of the device and reestablish stability. If the load is exceptionally heavy, the advantage provided by the leverage may not be sufficient, and the load will go out of control, resulting in injury to the operator or the load.

Quite often, the initial balancing of the load above the axle can result in muscle strain. If the load is at all shifting in nature, i.e., a liquid, the initial efforts to bring the center of gravity over the axle will cause the center of gravity to be carried backward until it overpowers the operator and knocks the hand truck to the ground.

The prior art has also disclosed a number of attachments for the conventional hand truck which are designed to provide an auxiliary wheel for the conventional hand truck. When thus equipped, the auxiliary wheel will assist the operator of the hand truck in stabilizing the vehicle during transit or movement. In general, these prior art devices are either extremely simple and do not provide the flexibility required by the operator, or they become quite complex and costly. Examples of these prior art devices are illustrated in U.S. Pat. No. 2,605,117, U.S. Pat. No. 3,499,659, and U.S. Pat. No. 3,655,212.

SUMMARY OF THE INVENTION

It is therefore an object of the present invention to provide an adjustable auxiliary wheel for a hand truck which will enable the operator to adjust the angle at which the hand truck is carried through an infinite number of positions or angles. This is essential since the angle required will vary for each load depending upon the center of gravity for that specific load.

It is also an object of this invention to provide a vehicle which may be placed in an angular relationship with respect to ground to assist the operator in loading the vehicle with a plurality of small individual loads. It is also simpler and easier for the operator to find the proper angular relationship without having to overexert himself if he starts with the vehicle in an angled relationship. The center of gravity for the load will certainly be closer to the axle of the hand truck if the vehicle is tilted than if it is vertical. Thus, the operator need only move the frame rails of the truck a small degree to find the proper angular relationship.

It is another object of the present invention to provide a secondary frame for a hand truck which connects the auxiliary wheel to the truck itself. The auxiliary frame is adjustable in length to assist in adjusting the base of the vehicle and the area over which the load is distributed.

Additionally, it is still another object of the invention to provide an adjustable gripping means for a hand truck having an adjustable auxiliary support wheel which enables the operator to make a series of minute fine adjustments to vary the angle of the upstanding frame rails with respect to the ground. This fine adjustment may be made by slidably adjusting the gripping means.

BRIEF DESCRIPTION OF THE DRAWINGS

FIG. 1 is an isometric view of a hand truck constructed in accordance with the teachings of the present invention.

FIG. 2 is a partially exploded and partially cut-away view of the gripping means of the present invention.

DESCRIPTION OF THE PREFERRED EMBODIMENTS

Figure 6:
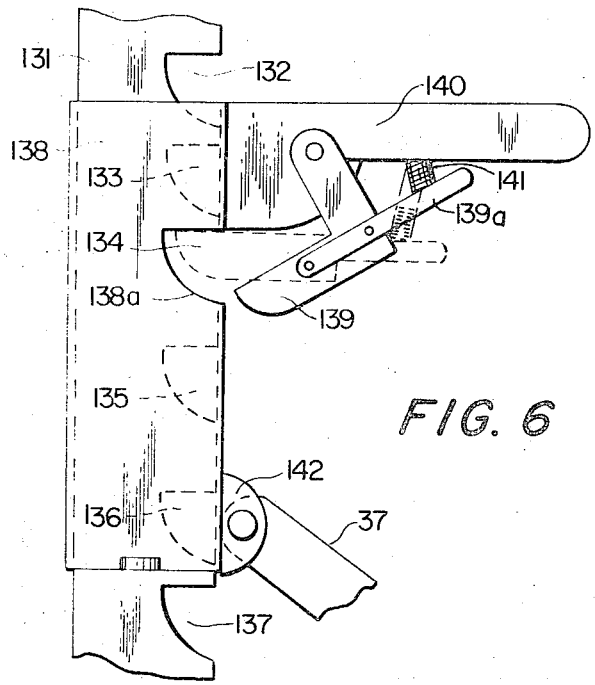
FIG. 6 is a close-up side view of an alternate form of the gripping means.

FIG. 1 is an isometric view of a tiltable hand truck having a pair of wheels 11 and 12, a support platform 13 and at least two upwardly extending frame rails 14 and 15. As illustrated in FIG. 1, the hand truck is equipped with three upwardly extending frame rails. The third rail 16 also defines a handle portion 16a which extends between two of the cross braces 17 and 18 to provide a central handle for the operator of the hand truck. In the embodiment illustrated in FIG. 1, the upwardly extending frame rails 14 and 15 and the connecting member 17 are all formed from a single piece of metal tubing. In addition to the cross braces 17 and 18, the hand truck is also equipped with cross braces 19 and 20. Cross braces 18, 19 and 20 are formed from steel straps and are normally welded to the upstanding frame rails 14, 15 and 16. The support platform 13 is bolted or welded to the upwardly extending frame rails 14 and 15 to provide a secure and stable support for the load to be carried. The wheels 11 and 12 are rotatably mounted upon axle member 21 which is carried by two generally U-shaped members 22 and 23 which are welded or otherwise permanently connected to the upwardly extending frame rails 14 and 15. The axle member 21 is securely mounted on the U-shaped members 22 and 23 by welding or collars such as that illustrated at 24. Each of the wheels 11 and 12 is journaled for rotation about axle 21 by bearing means contained within the hubs 25 and 26 of wheels 11 and 12.

In the embodiment illustrated in FIG. 1, the third interconnecting frame rail 16 extends downwardly from the handle portion and interconnects the cross braces 18, 19 and 20 with the upper portion of the frame rails 17 and the base plate 13 to provide additional bracing for heavy loads. Thus, in effect, the hand truck is comprised of two upwardly extending frame rails that parallel one another and a third upwardly extending frame rail mounted between the first two rails and positioned slightly behind the first two. Each of the cross braces 18, 19 and 20 is slightly curved and securely fastened to the frame rails 14, 15 and 16. This curvature not only increases the lateral strength of the vehicle, but also provides a semi-circular recess for the cartage of drums or other circular containers.

The auxiliary support mechanism is attached to the hand truck illustrated in FIG. 1 at four points. A secondary frame member generally indicated by numeral 27 is attached to the axle by means of U-bolts 28 and 29 and is free to pivot about the axis of rotation between the wheels and the upwardly extending frame rails. In normal use this secondary frame 27 is parallel to the ground or the work surface upon which the hand truck is being used.

A swivel wheel or castor 30 is mounted at the rear of the secondary frame 27 and provides the auxiliary support for the hand truck when the secondary frame means is in use. This wheel is free to rotate through 360° and is slightly castored so as to assume a following angle when the direction of the hand truck is changed.

The support mechanism also comprises an upwardly extending support rail 31 which is bolted to the center rail 16 and extends parallel to the upwardly extending frame rails 14 and 15. The upwardly extending support rail is mounted by means of brackets 32 and 33. Brackets 32 and 33 together with the U-bolts 28 and 29, comprise a four-point mounting system which connects the improved auxiliary support mechanism to the conventional hand truck. Brackets 32 and 33 are secured to the center rail 16 by means of bolts generally indicated by 34 and 35, although they could be permanently connected by means of rivets or welding. Thus, if it is desired to remove the auxiliary support mechanism, it is necessary only to disconnect the bolts attaching brackets 32 and 33, and the U-bolts 28 and 29, and the hand truck may be used in any conventional manner.

Adjustable gripping means 36 is mounted for reciprocation along the upwardly extending support rail 31. It is equipped, as will hereinafter be described, with a gripping means for fixedly gripping the support rail at a plurality of points along the support rail. The adjustment is infinite in that it may be adjusted to grip the support rail at any given point along its path of travel.

A linkage means 37 is provided to interconnect the gripping means 36 with the secondary frame means 27 to securely fix the secondary frame means at a specific angle with respect to the parallel frame rails for each specific point along the support rail. This angle is varied as the gripping means 36 reciprocates up and down the support rail 31.

Figures 3, 4:
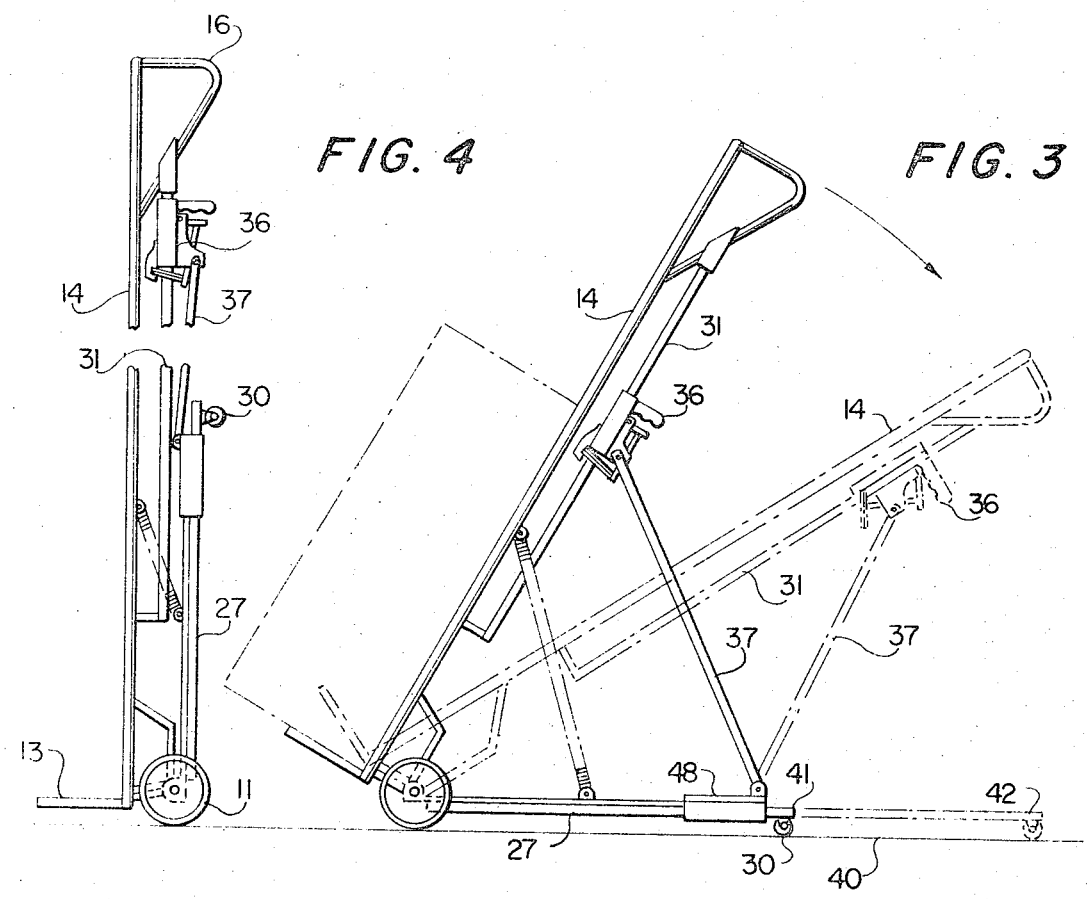
FIG. 3 is a side view of the present invention illustrating the lateral and vertical adjustments of the present invention.
FIG. 4 is a side view of the present invention with the auxiliary wheel fully retracted.

The relationship between the reciprocation of the gripping means 36 and the relative angular location of the upwardly extending frame rails 14 and 15 is illustrated in FIG. 3. As the gripping means is reciprocated upwardly, the angle between the upwardly extending frame rails 14 and the ground or work surface 40 decreases. When the gripping means has reached its extreme upper limit of travel, the secondary frame is parallel to the upwardly extending frame rails 14 as illustrated in FIG. 4. The hand truck may then be used in any conventional manner without the use of the auxiliary support mechanism.

The castor wheel 30 is independently mounted on an extensible support rail 41 which reciprocates within the secondary frame means 27. As such, the auxiliary wheel may be extended as illustrated at 42 by the dotted lines shown in FIGS. 1 and 3. The rail 41 reciprocates within a hollow member 43 which is securely fastened to the secondary frame means 27. While in the preferred embodiment square hollow tubing has been utilized, it would also be possible to employ other configurations such as round tubing or bar stock. The reciprocating frame 41 is secured to the support tubing 43 by means of a pin 44 or a bolt which extends through the tubing 43 and the rail 41. A plurality of holes indicated by numeral 45 are provided along the support tubing 43 to provide for the reciprocal or lateral adjustment of the frame member 41 and the castor wheel 30. The extension of castor wheel 30 is independent of the angular relationship between the secondary frame means 27 and the upwardly extending frame rails 14 and 15. It is used to extend the base of the vehicle and to provide for a more stable base when desired. The extension of the wheel 30 does not vary the angular relationship since the secondary frame means 27 remains parallel to the ground, and the linkage mechanism 37 is attached to the secondary frame 27 and not to the support rail 41.

The secondary frame means 27 comprises a pair of converging rails 46 and 47 which are joined together to form an apex at 48. The apex is located midway between the upwardly extending frame rails 14 and 15 and provides a central point for the attachment of the linkage means 37 and the auxiliary support wheel 30. The diverging ends of rails 46 and 47 are connected to axle 21 by means of U-bolts 28 and 29. Preferably, they diverge to the outer extremities of axle 21 immediately adjacent the upwardly extending frame rails 14 and 15. A cross brace 48 is provided for additional bracing and to provide support for the terminal end of tubing 43. In the preferred embodiment, the square tubing 43 is bolted across brace 48 at one end and extends through a pair of support plates 50 and 51 which form the apex of the secondary frame means 27. The castor wheel 30 then reciprocates from a point immediately adjacent the apex to the extended position 42 illustrated by the dotted lines in FIGS. 1 and 3.

A pair of spring members 52 and 53 is provided to assist in raising the secondary frame means when it is desired to retract the support mechanism to the position illustrated in FIG. 4. In essence, the spring means provide a counter-balance to the weight of the secondary frame means 27 so that the adjustable gripping means 36 is relatively free to reciprocate along the support rail 31 when the gripping means is disengaged.

The gripping means 36 is fully illustrated in FIG. 2 by a partially exploded and partially cut-away view. It comprises housing 60 which extends around the support rail 31, and at least one locking ring 61 having an aperture the same configuration but somewhat larger dimension than the cross-sectional dimension of the support rail 31. The locking ring is pivotally attached to the housing at 62 and is perpendicular to the axis of the support rail 31 when the gripping means is free to reciprocate along the support rail. Resilient means 63 is provided to pivot the locking ring about the pivot point 62 and cause the locking ring 61 to wedge or bind securely between the support rail 31 and the housing 60. In the preferred embodiment, a pair of locking rings 61 and 61a is used. An indent 62, defined by a holder 65, provides a pivot point for the locking rings 61 and 61a. It is welded or otherwise permanently secured to the housing or control barrel 60. As noted previously, the aperture 66 is of the same configuration and slightly larger than the cross-sectional dimensions of the support rail 31. In the preferred embodiment, square tubing has been employed and a square aperture has been used in the locking ring 61 and 61a. It would also be possible to provide for other configurations such as a circular aperture and circular support rail 31. The resilient means 63 is a compression spring which abuts against the upper lock ring 61a and fits over a pin 67 which is mounted in lock ring 61 and extends upwardly through lock ring 61a to provide a mounting point for the compression spring 63. The spring is biased or loaded by the cross plate 68 fitted to the barrel extension 69. This extension is also securely fastened to the barrel or housing 60.

The lock ring release mechanism comprises a handle 70 which is pivotally mounted to the support 69 by means of a pin 71. A fixed leg 72 interconnects the release handle 70 with the locking ring 61. The release handle 70 is also biased downwardly by means of tension spring 73.

A handle 74 is provided for moving the housing or control barrel 60 along the support member 31. The main load or thrust from the secondary frame means is transferred to the gripping means from link 37 to pin 75 mounted in the support member 69.

In operation, the gripping means is somewhat self-actuating. Once the locking rings have been moved into engagement with the support rail 31, any movement of the control barrel 60 upwardly will tend to apply pressure on the pivot point 62 and thereby wedge the leading edge of lock ring 61a into tighter engagement with the barrels 31. As the tension or force applied to pin 75 is increased, the force tending to drive the locking plate into support rail 31 is increased. The force of compression spring 63 is applied directly to the face of lock ring 61a while the force of tension spring 73 is applied directly to the locking ring 61. Thus, the forces applied by the springs 63 and 73 are additive, even though one is compression and the other is tension. To release the gripping means, it is only necessary to grip the handle 74 and the release handle 70 and pull upwardly on the handle member 70. This will bring the two locking rings 61 and 61a into a perpendicular relationship with the support post 31, and since the diameter of aperture 66 is slightly larger than the cross-section of post 31, the gripping means is then free to reciprocate upwardly and downwardly along support rail 31.

In operating the hand truck, the operator first obtains the proper balance for the load with the center of gravity of the load directly over axle 21. The handle 70 is pulled upwardly and the locking rings are disengaged from the support rail 31. The operator then adjusts the gripping means downwardly via handle 74 until the auxiliary support wheel engages the ground. After the proper angle has been determined the handle 70 is released and the resilient means 63 and 73 urge lock ring 61 and 61a into engagement with the support rail 31.

In some cases, it may be desirable to shift the center of gravity of the load slightly behind axle 21 to bias some weight onto auxiliary wheel 30. This will prevent the hand truck from tipping forward in the event of a small incline or surface irregularity which might raise wheel 30.

Figure 5:
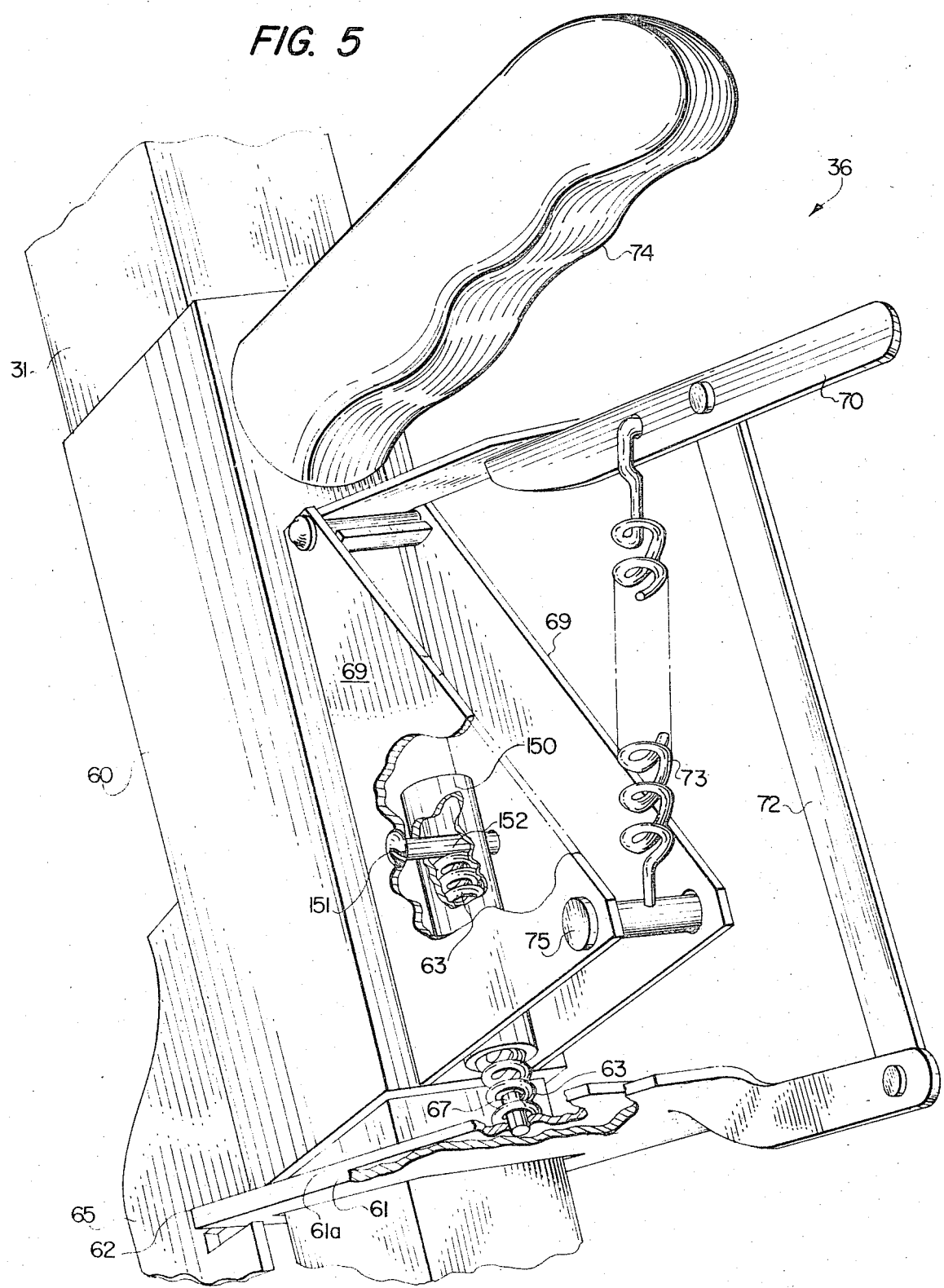
FIG. 5 is an isometric view of an alternate embodiment of the gripping means of the present invention.

An alternate form of the gripping means is illustrated in FIG. 5. As was previously described with respect to FIG. 2, a housing 60 extends around support rail 31 and slides along said support rail in a reciprocal manner. A pair of lock rings 61 and 61a are also pivotally mounted to the housing 60 by means of lug 65. In this embodiment of the invention, the main compression spring 63 is housed within a spring holder 150. Spring holder 150 is securely mounted to support 69 by means of pin 151 which extends through the support flanges 69 and spring holder 150. Thus pin 151 not only anchors the spring holder, but also provides an upper abutment or stop for spring 63 as indicated by numeral 152. The spring holder 150 is positioned as nearly as possible to the barrel 60 to provide rigid support for the compression spring and to prevent any lateral flexure. Compression spring 63 exerts its force against lock ring 61 and 61a in a conventional manner. It is anchored into the lock ring 61 and 61a by means of the pin 67 which is mounted in lock ring 61 and extends upwardly through lock ring 61a to provide a secure mounting point for spring 63.

Another alternate form of the gripping means is illustrated in FIG. 6. In this embodiment, the upwardly extending support rail 131 defines a plurality of notches 132–137 along the entire length of the support rail. Again, the configuration of the support rail is unimportant, but the housing or control barrel 138 of the gripping means must necessarily be of the same cross-sectional configuration. This allows the control barrel 138 to reciprocate upwardly and downwardly along the support rail 131 when the locking means 139 is disengaged. The locking means 139 is pivotally attached to a handle 140 which is securely mounted to the control barrel or housing 138. A resilient compression spring 141 biases the locking means 139 into the notch illustrated in 134 as shown by the dotted lines in FIG. 6. The housing 138 also defines a notch 138a which is identical in shape to the notches defined in the support rail 131. The pivot point and the angle of locking means 139 are so selected as to cause the entire load transmitted to housing 138 to be applied directly to support rail 131 without tending to disengage the locking means 139 from any of the notches into which it has been fitted. This can be accomplished by positioning the pivot points slightly over center so as to cause the upward force applied against barrel 138 to force the locking means 139 inwardly rather than outwardly. The load is applied to control barrel 138 through link 37 which engages the upstanding flange 142 defined on the exterior of housing 138.

In operation, the operator pulls upwardly on the release handle 139a to disengage it from notch 134 as illustrated in FIG. 6 and then slides the control barrel upwardly or downwardly to the new position. The handle 139a is then released and spring means 141 will cause the locking means 139 to engage the support rail 131 at its new location.

While the present invention has been described with reference to specific embodiments having a plurality of means for providing an auxiliary support mechanism, it

What we claim is:

1. In a tiltable hand truck having a pair of main wheels rotating on an axle, a support platform, and at least two upwardly extending frame rails, the improvement which comprises:
   a. a generally V-shaped secondary frame means having its bifurcated ends pivotally mounted about an axis of rotation parallel to the axle supporting said main wheels, said secondary frame being substantially parallel to the ground when said secondary frame is in use and with said bifurcated ends lying inwardly of said main wheels,
   b. at least one auxiliary wheel operatively connected to said secondary frame,
   c. an upwardly extending support rail mounted on said truck parallel to said upwardly extending frame rails,
   d. adjustable gripping means for reciprocating along and fixably gripping said support rail at a plurality of points along said support rail,
   e. linkage means linking said adjustable gripping means to said secondary frame at the junction of said bifurcated ends to securely fix said secondary frame means at a specific angle to said parallel frame rails at a specific point along said support rail, said angle being varied as the gripping means reciprocates along said support rail.

2. A tiltable hand truck as claimed in claim 1 wherein said adjustable gripping means further comprises:
   a. a housing extending around said support rail,
   b. at least one locking ring having an aperture of the same configuration and slightly larger dimension than the cross section of said support rail, said at least one locking ring being pivotally attached to said housing, said ring being perpendicular to said support rail when said gripping means is reciprocating along said support rail, and
   c. resilient means mounted between said housing and gripping means to pivot said at least one locking ring about a pivot point and cause the ring to wedge securely between said support rail and said housing when said gripping means is in its fixed position.

3. The apparatus of claim 2 wherein said adjustable locking means comprises two said locking rings which are superimposed one on top the other, said housing defining a pivot for said locking rings, and first and second spring means each urging a respective one of said rings into a locking position relative to said support rail.

4. A tiltable hand truck as claimed in claim 1 wherein said auxiliary wheel comprises a castor wheel which is free to rotate in any direction.

5. A tiltable hand truck as claimed in claim 4 wherein said castor wheel is mounted on a third frame means, said third frame means reciprocating relative to said secondary frame means to adjust the distance between said auxiliary wheel and said pair of wheels mounted on said hand truck.

6. A tiltable hand truck as claimed in claim 1 wherein said support rail defines a plurality of notches along its longitudinal dimension, and said gripping means defines a pivotable locking means to engage said notches and lock said gripping means in place at each notch location.

7. A tiltable hand truck as claimed in claim 1 which further comprises resilient means for urging said secondary frame means towards said parallel frame rails, said movement being resisted by said linkage means when said secondary frame means is in use.

8. A tiltable hand truck as claimed in claim 1 wherein said upwardly extending support rail is located midway between said upwardly extending frame rails.

9. In a tiltable hand truck having a pair of wheels, a support platform, and at least two upwardly extending frame rails, the improvement which comprises
   a. a secondary frame means mounted on said truck to pivot about the axis of rotation between said wheels and said upwardly extending frame rails, said secondary frame being substantially parallel to the ground when said secondary frame is in use,
   b. an upwardly extending support rail mounted on said truck parallel to said upwardly extending frame rails,
   c. adjustable gripping means for reciprocating along and fixably gripping said support rail at a plurality of points along said support rail,
   d. linkage means linking said adjustable gripping means to said secondary frame to securely fix said secondary frame means at a specific angle to said parallel frame rails at a specific point along said support rail, said angle being varied as the gripping means reciprocates along said rail, and
   e. a third frame means which reciprocates relative to said secondary frame means and an auxiliary castor which is supported on said third frame means whereby the distance between said auxiliary castor and said wheels may be varied.

* * * * *